United States Patent
Wang et al.

(10) Patent No.: US 12,429,936 B2
(45) Date of Patent: Sep. 30, 2025

(54) CHIP POWER SUPPLY CIRCUIT AND ELECTRONIC DEVICE

(71) Applicant: Bitmain Technologies Inc., Beijing (CN)

(72) Inventors: Lijun Wang, Beijing (CN); Fei Wu, Beijing (CN)

(73) Assignee: BITMAIN TECHNOLOGIES INC., Beijing (CN)

( * ) Notice: Subject to any disclaimer, the term of this patent is extended or adjusted under 35 U.S.C. 154(b) by 379 days.

(21) Appl. No.: 18/201,746

(22) Filed: May 24, 2023

(65) Prior Publication Data

US 2023/0297150 A1 Sep. 21, 2023

Related U.S. Application Data

(63) Continuation of application No. PCT/CN2021/131287, filed on Nov. 17, 2021.

(30) Foreign Application Priority Data

Nov. 25, 2020 (CN) .......................... 202011346368.5

(51) Int. Cl.
  *G06F 1/26* (2006.01)
  *H02M 3/156* (2006.01)

(52) U.S. Cl.
  CPC ............ *G06F 1/266* (2013.01); *H02M 3/156* (2013.01)

(58) Field of Classification Search
  CPC .................. G06F 1/266; H02M 3/156
  See application file for complete search history.

(56) References Cited

U.S. PATENT DOCUMENTS

| | | | |
|---|---|---|---|
| 12,248,349 B2 * | 3/2025 | Gao | G06F 1/263 |
| 2015/0318026 A1 | 11/2015 | Clark et al. | |
| 2020/0142461 A1 * | 5/2020 | Holm | G06F 21/64 |

FOREIGN PATENT DOCUMENTS

| | | | | |
|---|---|---|---|---|
| CN | 106774758 A | 5/2017 | | |
| CN | 108040418 A | 5/2018 | | |
| CN | 108923778 A | 11/2018 | | |
| CN | 208890646 U | 5/2019 | | |
| CN | 110069119 A | 7/2019 | | |
| CN | 209949520 U | 1/2020 | | |
| CN | 111103961 A | 5/2020 | | |
| RU | 2601251 C1 | 10/2016 | | |
| WO | 2019120295 A1 | 6/2019 | | |
| WO | WO-2019119963 A1 * | 6/2019 | ............. | H02M 3/04 |
| WO | 2020057180 A1 | 3/2020 | | |

* cited by examiner

*Primary Examiner* — Mark A Connolly
(74) *Attorney, Agent, or Firm* — MASCHOFF BRENNAN; Liang Huang

(57) ABSTRACT

Provided are a chip power supply circuit and an electronic device, which relate to the field of power supply technologies. The chip power supply circuit includes: at least two chip domains, where the at least two chip domains are sequentially connected, and in two adjacent chip domains, a ground port of a previous-stage chip domain is connected to a primary power supply port of a next-stage chip domain; and at least one voltage conversion circuit, where in the two adjacent chip domains, the ground port of the previous-stage chip domain is connected to a secondary power supply port of the next-stage chip domain through a voltage conversion circuit of the at least one voltage conversion circuit, and the voltage conversion circuit is configured to output a target voltage to the secondary power supply port.

20 Claims, 3 Drawing Sheets

CHIP POWER SUPPLY CIRCUIT AND ELECTRONIC DEVICE

CROSS-REFERENCE TO RELATED APPLICATIONS

The present application is a U.S. continuation under 35 U.S.C. § 111(a) of International Application No. PCT/CN2021/131287 filed on Nov. 17, 2021, which claims priority to Chinese Patent Application No. 202011346368.5, filed with the China National Intellectual Property Administration on Nov. 25, 2020 and entitled "CHIP POWER SUPPLY CIRCUIT AND ELECTRONIC DEVICE". The contents of these applications are incorporated herein by reference in their entirety for all purposes.

TECHNICAL FIELD

The present disclosure relates to the field of power supply technologies.

BACKGROUND

Power consumption of a data generation device that needs to perform a huge amount of computation is quite high, and a power supply technology for the data generation device needs to be improved. To maximize conversion efficiency of a power supply, a power supply method based on series-connected chips may be used on a printed circuit board, forming multiple stages of series-connected voltage domains between a power input terminal and a ground port. However, when there are many stages of chips, because secondary power supply ports of chips at all the stages need to consume current, and a chip at the first stage requires a higher voltage, currents of chips at subsequent stages gradually increase, and voltages of chips at different stages vary, resulting in different performance of chips at different stages and reducing operational performance of the data generation device.

SUMMARY

The present disclosure provides a chip power supply circuit and an electronic device.

According to an aspect, the present disclosure provides a chip power supply circuit. The chip power supply circuit includes: at least two chip domains, where the at least two chip domains are sequentially connected, and in two adjacent chip domains, a ground port of a previous-stage chip domain is connected to a primary power supply port of a next-stage chip domain; and at least one voltage conversion circuit, where in the two adjacent chip domains, the ground port of the previous-stage chip domain is connected to a secondary power supply port of the next-stage chip domain through a voltage conversion circuit, and the voltage conversion circuit is configured to output a target voltage to the secondary power supply port.

According to another aspect, the present disclosure provides an electronic device, and the electronic device includes a chip power supply circuit as described above.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that terms used in this specification of the present disclosure are only for the purpose of describing specific embodiments, and are not intended to limit the present disclosure. As used in this specification and the appended claims of the present disclosure, the singular forms "a", "an", and "the" are intended to include plural forms, unless otherwise explicitly specified in the context.

It should be further understood that the term "and/or" used in this specification and the appended claims of the present disclosure indicates any combination and all possible combinations of one or more items listed in association, and includes the combinations.

Figure 1:
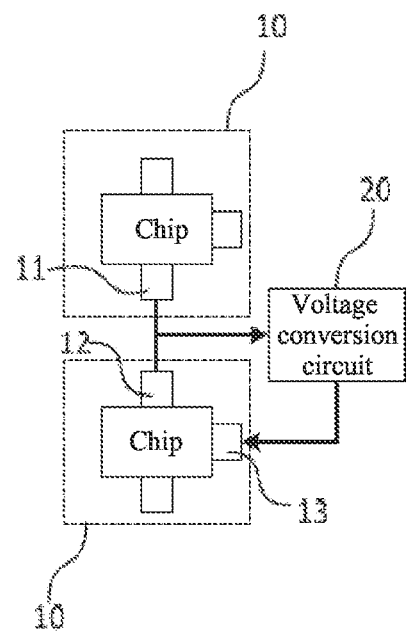
FIG. 1 is a schematic modular diagram of a chip power supply circuit according to an embodiment of the present disclosure.

FIG. 1 is a schematic modular diagram of a chip power supply circuit according to an embodiment of the present disclosure. As shown in FIG. 1, the chip power supply circuit includes at least two chip domains 10 and at least one voltage conversion circuit 20.

The at least two chip domains 10 are sequentially connected. In two adjacent chip domains 10, a ground port 11 of a previous-stage chip domain 10 is connected to a primary power supply port 12 of a next-stage chip domain 10. In the two adjacent chip domains 10, the ground port 11 of the previous-stage chip domain 10 is connected to a secondary power supply port 13 of the next-stage chip domain 10 through a voltage conversion circuit 20, and the voltage conversion circuit 20 is configured to output a target voltage to the secondary power supply port 13.

Each chip domain is provided with a ground port, a primary power supply port, and a secondary power supply port. The primary power supply port is configured to provide primary electric energy for the chip domain, and the primary power supply port is usually connected to a power supply. The secondary power supply port is configured to provide secondary electric energy for the chip domain. A plurality of chip domains are sequentially connected. A primary power supply port of the first-stage chip domain is connected to the power supply. A ground port of a previous-stage chip domain is connected to a primary power supply port of a next-stage chip domain, so that the previous-stage chip domain provides primary electric energy for the next-stage chip domain. A ground port of the last-stage chip domain is grounded. The plurality of chip domains supply power in series.

Electric energy can be drawn from a chip domain and provided for a secondary power supply port. A voltage in the series power supply circuit is converted by a voltage conversion circuit to a target voltage required for the secondary power supply port. In two adjacent chip domains, a ground port of a previous-stage chip domain is connected to a secondary power supply port of a next-stage chip domain through a voltage conversion circuit, so that the secondary power supply port of the next-stage chip domain directly draws electric energy from a power domain to which the chip domain belongs. This can improve the balance between power domains that supply power in series, and can also reduce wirings, an area, and costs during layout of a printed circuit board.

Figure 2:
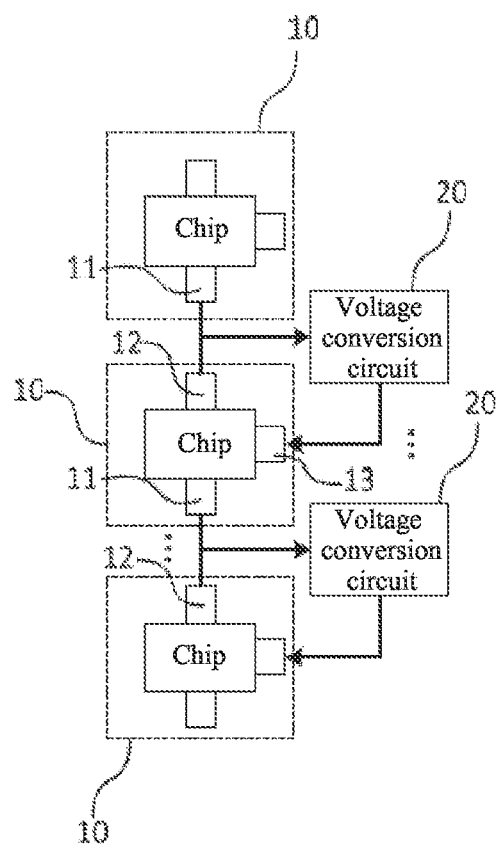
FIG. 2 is a schematic modular diagram of another chip power supply circuit according to an embodiment of the present disclosure.

As shown in FIG. 2, a chip power supply circuit includes a plurality of chip domains 10, and a voltage conversion circuit 20 is disposed between each two adjacent chip domains 10. Therefore, a quantity of voltage conversion circuits 20 corresponds to a quantity of chip domains 10, and the quantity of voltage conversion circuits 20 may be equal to the quantity of chip domains 10 minus 1.

In the chip power supply circuit provided in the embodiments of the present disclosure, a voltage conversion circuit is disposed between two adjacent chip domains, so that a secondary power supply port of each chip domain can draw electric energy from a power domain to which the chip domain belongs. This can improve the balance between voltages for the chip domains, and optimize operational performance and computational performance of the chip domains.

In an embodiment, the chip domains 10 each includes a first quantity of chips, and the first quantity is greater than or equal to 1; in the two adjacent chip domains 10, ground ports 11 of chips in the previous-stage chip domain 10 are respectively connected to primary power supply ports 12 of chips in the next-stage chip domain 10; and in the two adjacent chip domains 10, the ground ports 11 of the chips in the previous-stage chip domain 10 are all connected to an input terminal of the voltage conversion circuit 20, and the secondary power supply ports 13 of the chips in the next-stage chip domain 10 are all connected to an output terminal of the voltage conversion circuit 20.

Each chip domain includes a first quantity of chips. Therefore, during series power supply connection, chips in a previous-stage chip domain may be respectively connected to chips in a next-stage chip domain. The chip power supply circuit includes a first quantity of series chip circuits. Each chip is provided with a ground port, a primary power supply port, and a secondary power supply port. Each chip domain also includes a first quantity of ground ports, a first quantity of primary power supply ports, and a first quantity of secondary power supply ports.

Figure 3:
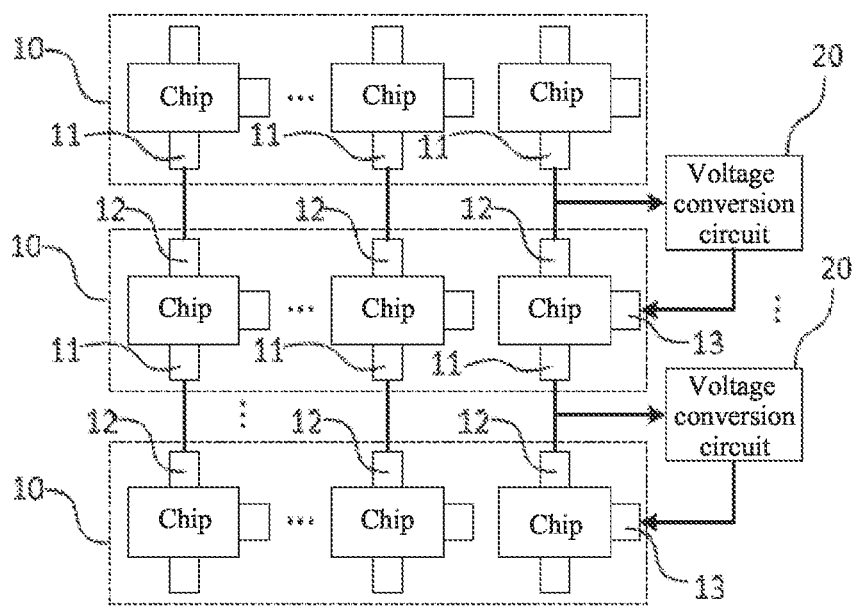
FIG. 3 is a schematic modular diagram of another chip power supply circuit according to an embodiment of the present disclosure.

As shown in FIG. 3, ground ports 11 of chips in a previous-stage chip domain 10 are respectively connected to primary power supply ports 12 of chips in a next-stage chip domain 10. In each two adjacent chip domains 10, the ground ports 11 of the chips in the previous-stage chip domain 10 are all connected to an input terminal of the voltage conversion circuit 20, and the secondary power supply ports 13 of the chips in the next-stage chip domain 10 are all connected to an output terminal of the voltage conversion circuit 20. The voltage conversion circuit obtains electric energy from the previous-stage chip domain, converts the electric energy into a target voltage, and provides the target voltage for the secondary power supply ports of all the chips in the next-stage chip domain.

In an embodiment, primary power supply ports of chips in the first-stage chip domain are all connected to a power supply, and ground ports of chips in the last-stage chip domain are all grounded.

A plurality of chips in each chip domain are connected in parallel. Primary power supply ports of all chips in the first-stage chip domain are connected to the power supply. The power supply provides primary electric energy for a first quantity of series chip circuits. Ground ports of all chips in the last-stage chip domain are grounded.

Figure 4:
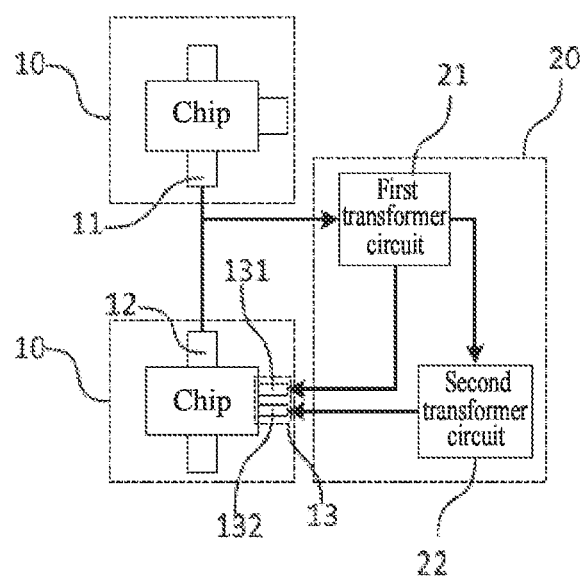
FIG. 4 is a schematic modular diagram of another chip power supply circuit according to an embodiment of the present disclosure.

In an embodiment, as shown in FIG. 4, the secondary power supply port 13 includes a first power supply pin 131 and a second power supply pin 132, and the voltage conversion circuit 20 is configured to output a first voltage to the first power supply pin 131, and output a second voltage to the second power supply pin 132.

Each chip is provided with a first power supply pin and a second power supply pin. The first power supply pin and the second power supply pin need to obtain secondary electric energy of different voltages, and supply power to the chip at different voltages.

The voltage conversion circuit may output a first voltage and provide the first voltage for the first power supply pin of the chip. The voltage conversion circuit may further output a second voltage and provide the second voltage for the second power supply pin of the chip.

In an embodiment, as shown in FIG. 4, the voltage conversion circuit 20 includes a first transformer circuit 21 and a second transformer circuit 22; an input terminal of the first transformer circuit 21 is connected to the ground port 11 of the previous-stage chip domain 10, and an output terminal of the first transformer circuit 21 is connected to the first power supply pin 131 and provides the first voltage for the first power supply pin 131; and an input terminal of the second transformer circuit 22 is connected to the output terminal of the first transformer circuit 21, and an output terminal of the second transformer circuit 22 is connected to the second power supply pin 132 of the next-stage chip domain 10 and provides the second voltage for the second power supply pin 132.

A voltage provided by a power supply, namely, a voltage on a primary power supply port of a chip domain, is different from a voltage value of the first voltage and a voltage value of the second voltage. Therefore, the two transformer circuits can be used to convert the voltage on the primary power supply port to the first voltage and the second voltage.

In some embodiments, the first transformer circuit may be a boost circuit, and the second transformer circuit may be a buck circuit. The voltage provided by the power supply is usually lower than the first voltage, and the second voltage is lower than the first voltage. Therefore, the voltage on the primary power supply port may be first boosted by the first transformer circuit to obtain the first voltage. The output terminal of the first transformer circuit is connected to the first power supply pin to provide the first voltage for the first power supply pin of the chip. In addition, the input terminal of the second transformer circuit is connected to the output terminal of the first transformer circuit, so that the second transformer circuit can reduce the first voltage to the second voltage, and provide the second voltage for the second power supply pin of the chip. In an embodiment, the first transformer circuit is a boost circuit, and the second transformer circuit is a buck circuit.

The boost circuit is a switched DC-DC boost circuit, and can make an output voltage higher than an input voltage. The buck circuit is a voltage reduction circuit. The boost circuit and the buck circuit are combined to output two voltages and supply power to the first power supply pin and the second power supply pin of the chip.

In an embodiment, the first power supply pin is an I/O unit, and the second power supply pin is a phase locked loop (PLL) unit.

A voltage required for the input/output (I/O) unit is the first voltage. In some embodiments, the first voltage may be 1.8 volts. A voltage required for the phase locked loop (PLL) unit is the second voltage. In some embodiments, the second voltage is 0.8 volts.

An embodiment of the present disclosure further provides an electronic device, and the electronic device includes a chip power supply circuit of any one of the foregoing embodiments. The electronic device may include a plurality of chip power supply circuits.

In an embodiment, the electronic device is a data generation device.

The foregoing descriptions are merely specific implementations of the present disclosure, but are not intended to limit the protection scope of the present disclosure. Any equivalent modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A chip power supply circuit, comprising:
   at least two chip domains, wherein the at least two chip domains are sequentially connected, and in two adjacent chip domains comprising a previous-stage chip domain and a next-stage chip domain, a ground port of the previous-stage chip domain is connected to a primary power supply port of the next-stage chip domain; and
   at least one voltage conversion circuit, wherein in the two adjacent chip domains, the ground port of the previous-stage chip domain is connected to a secondary power supply port of the next-stage chip domain through a voltage conversion circuit of the at least one voltage conversion circuit, and the voltage conversion circuit is configured to output a target voltage to the secondary power supply port.

2. The chip power supply circuit of claim 1, wherein:
   the at least two chip domains each comprises a first quantity of chips, and the first quantity is greater than or equal to 1;
   in the two adjacent chip domains, ground ports of chips in the previous-stage chip domain are respectively connected to primary power supply ports of chips in the next-stage chip domain; and
   in the two adjacent chip domains, the ground ports of the chips in the previous-stage chip domain are all connected to an input terminal of the voltage conversion circuit, and secondary power supply ports of the chips in the next-stage chip domain are all connected to an output terminal of the voltage conversion circuit.

3. The chip power supply circuit of claim 2, wherein:
   primary power supply ports of chips in a first-stage chip domain of the at least two chip domains are all connected to a power supply, and
   ground ports of chips in a last-stage chip domain of the at least two chip domains are all grounded.

4. The chip power supply circuit of claim 1, wherein:
   the secondary power supply port comprises a first power supply pin and a second power supply pin, and
   the voltage conversion circuit is configured to output a first voltage to the first power supply pin, and output a second voltage to the second power supply pin.

5. The chip power supply circuit of claim 4, wherein:
   the voltage conversion circuit comprises a first transformer circuit and a second transformer circuit;
   an input terminal of the first transformer circuit is connected to the ground port of the previous-stage chip domain, and an output terminal of the first transformer circuit is connected to the first power supply pin and provides the first voltage for the first power supply pin; and
   an input terminal of the second transformer circuit is connected to the output terminal of the first transformer circuit, and an output terminal of the second transformer circuit is connected to the second power supply pin of the next-stage chip domain and provides the second voltage for the second power supply pin.

6. The chip power supply circuit of claim 5, wherein the first transformer circuit is a boost circuit, and the second transformer circuit is a buck circuit.

7. The chip power supply circuit of claim 6, wherein the first voltage is greater than the second voltage.

8. The chip power supply circuit of claim 5, wherein the first voltage is greater than the second voltage.

9. The chip power supply circuit of claim 4, wherein the first power supply pin is an I/O unit, and the second power supply pin is a phase locked loop (PLL) unit.

10. The chip power supply circuit of claim 9, wherein the first voltage is greater than the second voltage.

11. The chip power supply circuit of claim 4, wherein the first voltage is greater than the second voltage.

12. An electronic device, comprising a chip power supply circuit, wherein the chip power supply circuit comprises:
    at least two chip domains, wherein the at least two chip domains are sequentially connected, and in two adjacent chip domains comprising a previous-stage chip domain and a next-stage chip domain, a ground port of the previous-stage chip domain is connected to a primary power supply port of the next-stage chip domain; and
    at least one voltage conversion circuit, wherein in the two adjacent chip domains, the ground port of the previous-stage chip domain is connected to a secondary power supply port of the next-stage chip domain through a voltage conversion circuit of the at least one voltage conversion circuit, and the voltage conversion circuit is configured to output a target voltage to the secondary power supply port.

13. The electronic device of claim 12, wherein the at least two chip domains each comprises a first quantity of chips, and the first quantity is greater than or equal to 1;
    in the two adjacent chip domains, ground ports of chips in the previous-stage chip domain are respectively connected to primary power supply ports of chips in the next-stage chip domain; and
    in the two adjacent chip domains, the ground ports of the chips in the previous-stage chip domain are all connected to an input terminal of the voltage conversion circuit, and secondary power supply ports of the chips in the next-stage chip domain are all connected to an output terminal of the voltage conversion circuit.

14. The electronic device of claim 13, wherein:

primary power supply ports of chips in a first-stage chip domain of the at least two chip domains are all connected to a power supply, and ground ports of chips in a last-stage chip domain of the at least two chip domains are all grounded.

15. The electronic device of claim 12, wherein:

the secondary power supply port comprises a first power supply pin and a second power supply pin, and the voltage conversion circuit is configured to output a first voltage to the first power supply pin, and output a second voltage to the second power supply pin.

16. The electronic device of claim 15, wherein:

the voltage conversion circuit comprises a first transformer circuit and a second transformer circuit;

an input terminal of the first transformer circuit is connected to the ground port of the previous-stage chip domain, and an output terminal of the first transformer circuit is connected to the first power supply pin and provides the first voltage for the first power supply pin; and an input terminal of the second transformer circuit is connected to the output terminal of the first transformer circuit, and an output terminal of the second transformer circuit is connected to the second power supply pin of the next-stage chip domain and provides the second voltage for the second power supply pin.

17. The electronic device of claim 16, wherein the first transformer circuit is a boost circuit, and the second transformer circuit is a buck circuit.

18. The electronic device of claim 15, wherein the first power supply pin is an I/O unit, and the second power supply pin is a phase locked loop (PLL) unit.

19. The electronic device of claim 15, wherein the first voltage is greater than the second voltage.

20. The electronic device of claim 12, wherein the electronic device is a data generation device.

* * * * *